US012654472B2

(12) United States Patent
Yoshizawa et al.

(10) Patent No.: US 12,654,472 B2
(45) Date of Patent: Jun. 16, 2026

(54) PRINTING APPARATUS, CONTROLLING METHOD, AND STORAGE MEDIUM

(71) Applicant: CANON KABUSHIKI KAISHA, Tokyo (JP)

(72) Inventors: Kei Yoshizawa, Tokyo (JP); Kazuki Narumi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 193 days.

(21) Appl. No.: 18/592,737

(22) Filed: Mar. 1, 2024

(65) Prior Publication Data

US 2024/0308244 A1 Sep. 19, 2024

(30) Foreign Application Priority Data

Mar. 13, 2023 (JP) ................................ 2023-038995

(51) Int. Cl.
*B41J 11/00* (2006.01)
*B41J 2/21* (2006.01)

(52) U.S. Cl.
CPC .......... *B41J 11/0022* (2021.01); *B41J 2/2117* (2013.01)

(58) Field of Classification Search
CPC .. B41J 11/0022; B41J 2/2117; B41J 11/00222
See application file for complete search history.

(56) References Cited

U.S. PATENT DOCUMENTS

| | | | | |
|---|---|---|---|---|
| 8,485,620 | B2 | 7/2013 | Kitabatake | |
| 8,727,519 | B2 | 5/2014 | Nakagawa | |
| 8,950,844 | B2 | 2/2015 | Takahashi | |
| 9,007,653 | B2 | 4/2015 | Ojiro | |
| 9,227,423 | B2 | 1/2016 | Yazawa | |
| 10,688,820 | B2 | 6/2020 | Ushiyama | |
| 11,813,853 | B2 | 11/2023 | Kawafuji | |
| 2012/0154468 | A1* | 6/2012 | Takekoshi | B41J 2/2107 347/14 |
| 2018/0257417 | A1 | 9/2018 | Ushiyama | |
| 2022/0324223 | A1 | 10/2022 | Nagai | |
| 2023/0142347 | A1 | 5/2023 | Yoshizawa | |

FOREIGN PATENT DOCUMENTS

| | | |
|---|---|---|
| JP | 2006-205506 A | 8/2006 |
| JP | 2018-149735 A | 9/2018 |

OTHER PUBLICATIONS

"Paper and Board—Determination of the Liquid Absorbability—Bristow's Method," Japan Tappi Paper Pulp Test Method No. 51, Japan Tappi Paper and Pulp Test Methods, 2000, pp. 51/1-51/6.

* cited by examiner

*Primary Examiner* — Bradley W Thies
(74) *Attorney, Agent, or Firm* — Venable LLP

(57) ABSTRACT

The present invention provides a printing apparatus, a controlling method, and a storage medium capable of outputting high-quality images. To this end, the air blow condition for the air blow unit during printing is varied with a light-shielding ink laminating print mode, which is a print mode, and the effect of cockling on the print medium taken into account in addition to the wettability of the print medium.

19 Claims, 16 Drawing Sheets

WITHOUT AIR BLOW
TOWARD PLATEN
(EXAMPLE WITH EXCESSIVE INK
SPREADING PHENOMENON)

WITH AIR BLOW
TOWARD PLATEN

WITH AIR BLOW
TOWARD PLATEN
(EXAMPLE WITH EXCESSIVE INK
SHRINKAGE PHENOMENON)

WITHOUT AIR BLOW
TOWARD PLATEN

| | MATERIAL | INK CONTACT ANGLE θ |
|---|---|---|
| PRINT MEDIUM A | PVC | 55.6° |
| PRINT MEDIUM B | PP | 47.7° |
| PRINT MEDIUM C | PET | 52.6° |
| PRINT MEDIUM D | PET | 41.9° |
| PRINT MEDIUM E | PULP | 50.7° |

FIG.9

| | MATERIAL | INK WETTING DIAMETER RATIO d1/d0 |
|---|---|---|
| PRINT MEDIUM A | PVC | 2.3 |
| PRINT MEDIUM B | PP | 4.6 |
| PRINT MEDIUM C | PET | 2.6 |
| PRINT MEDIUM D | PET | 5.5 |
| PRINT MEDIUM E | PULP | 3.0 |

FIG.10

| | AIR BLOW | SET TEMPERATURE | SET AIR SPEED |
|---|---|---|---|
| AIR BLOW CONDITION 1 | YES | 30℃ | 3m/s |
| AIR BLOW CONDITION 2 | NO | N.A. | N.A. |

FIG.14

| | MATERIAL | COCKLING | INK CONTACT ANGLE θ |
|---|---|---|---|
| PRINT MEDIUM A | PVC | SMALL | 55.6° |
| PRINT MEDIUM B | PP | SMALL | 47.7° |
| PRINT MEDIUM C | PET | SMALL | 52.6° |
| PRINT MEDIUM D | PET | SMALL | 41.9° |
| PRINT MEDIUM E | PULP | LARGE | 50.7° |

FIG.15

PRINTING APPARATUS, CONTROLLING METHOD, AND STORAGE MEDIUM

BACKGROUND OF THE INVENTION

Field of the Invention

The present invention relates to a printing apparatus, a controlling method, and a storage medium.

Description of the Related Art

Inkjet printing apparatuses in recent years are capable of performing printing for various purposes and use various types of inks to that end. In particular, there are an increasing number of printers capable of performing printing on poorly-permeable print media in recent years. In a case of using a poorly-permeable print medium, a reaction liquid is sometimes used in order to reduce breeding of color inks and improve uniformity.

There are cases where highly-permeable print media are used on printers as above capable of performing printing on poorly-permeable print media. The reaction liquid does not need to be used in the case of using a highly-permeable print media.

Japanese Patent Laid-Open No. 2018-149735 discloses a printing method in which printing using a reaction liquid is performed on a poorly-permeable print medium and the reaction liquid is not used for a highly-permeable print medium.

There are poorly-permeable print media with high wettability and ones with low wettability. The easily wettable print media experience a phenomenon in which an ink spreads beyond a desired range, thus causing breeding, even with a reaction liquid used in the same amount as for the not easily wettable print media. Here, Japanese Patent Laid-Open No. 2018-149735 describes nothing about print media that have low permeability and are easily wettable.

SUMMARY OF THE INVENTION

In view of the above, the present invention provides a printing apparatus, a printing method, and a storage medium capable of outputting high-quality images.

To this end, the printing apparatus of the present invention includes: a printing unit that performs printing by ejecting a liquid onto a print medium; a support unit that supports the print medium to be printed by the printing unit; an air blow unit that blows air onto the print medium supported by the support unit; and a control unit causes the air blow unit to blow air under a first air blow condition in a case where the print medium is a first print medium, and causes the air blow unit to blow air under a second air blow condition which exerts a higher drying effect than the first air blow condition in a case where the print medium is a second print medium on which a contact angle of the liquid is smaller than a contact angle of the liquid on the first print medium.

In accordance with the present invention, it is possible to provide a printing apparatus, a controlling method, and a storage medium capable of outputting high-quality images.

Further features of the present invention will become apparent from the following description of exemplary embodiments with reference to the attached drawings.

BRIEF DESCRIPTION OF THE DRAWINGS

FIG. 9 is a diagram illustrating a list of wettability evaluation results on several types of print media;

FIG. 10 is a diagram illustrating a list ink wetting diameter ratios from wettability evaluation results;

FIG. 14 is a diagram illustrating air blow conditions during printing;

FIG. 15 is a diagram illustrating profile data of print media; and

DESCRIPTION OF THE EMBODIMENTS

First Embodiment

A first embodiment of the present invention will be described below with reference to drawings.

Figure 1A:
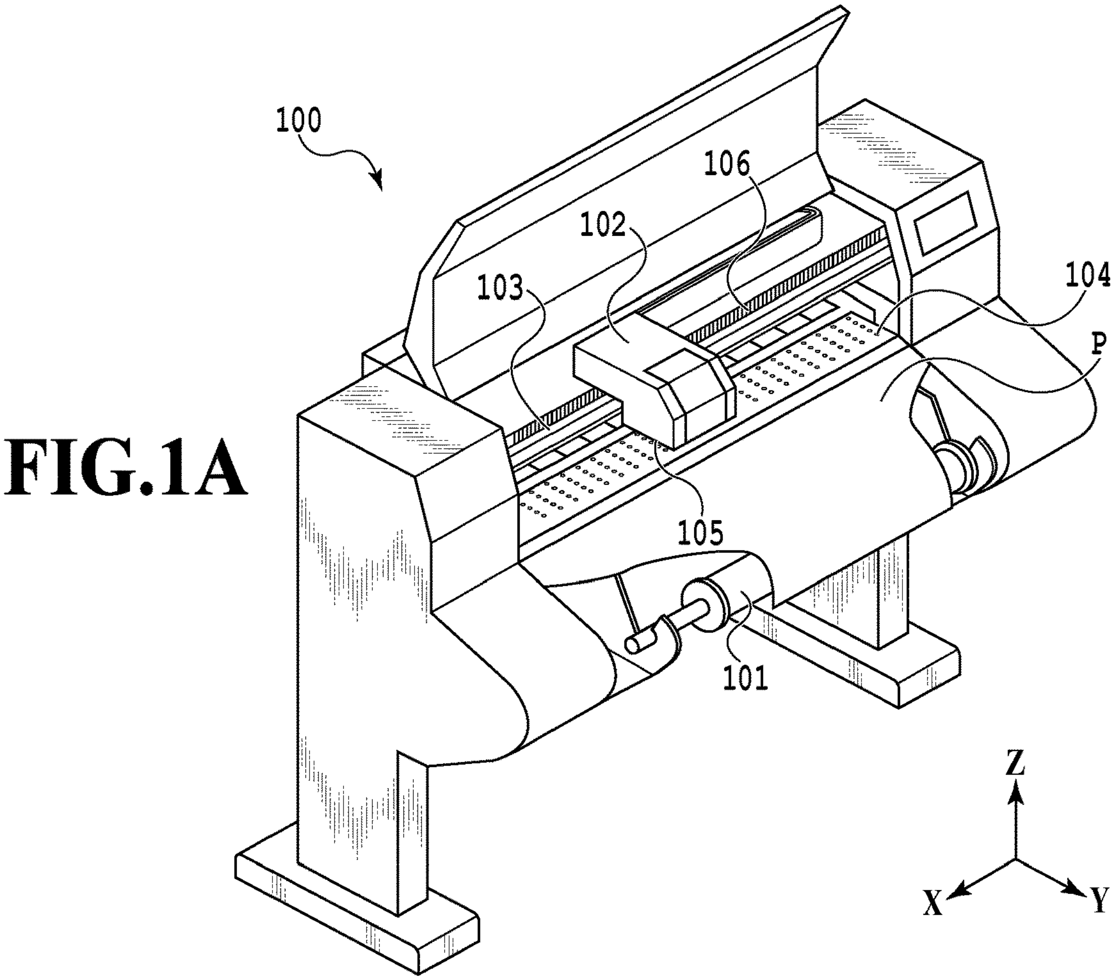
FIG. 1A is a view illustrating a printing apparatus.
Figure 1B:
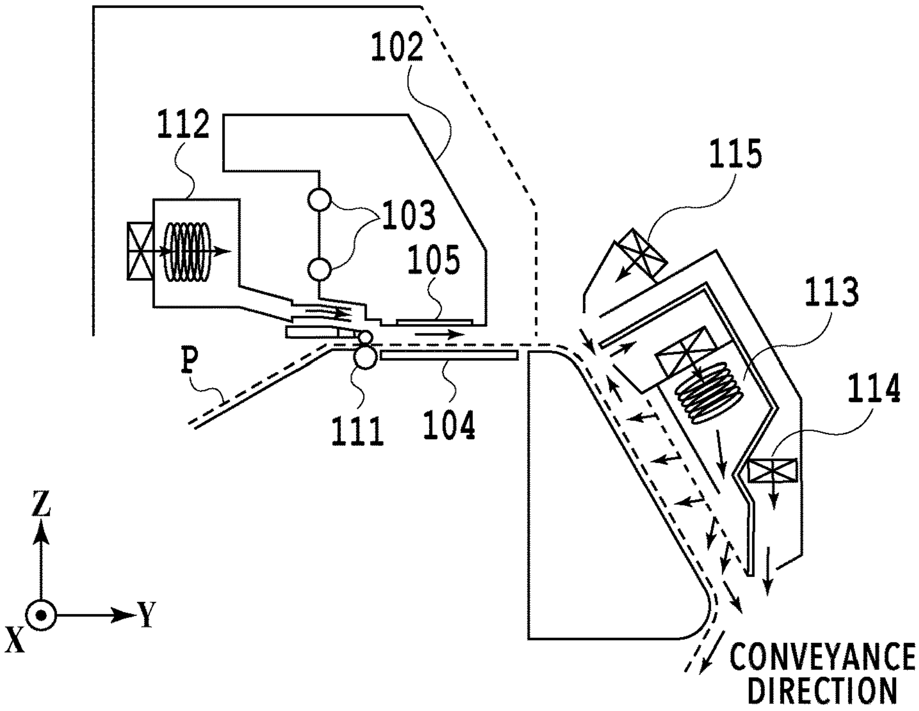
FIG. 1B is a view illustrating the printing apparatus.

FIG. 1A is an exterior perspective view illustrating an inkjet printing apparatus (hereinafter also referred to as "printing apparatus") 100 according to the present embodiment. FIG. 1B is a side view illustrating the printing apparatus 100. The printing apparatus 100 is a so-called serial scan-type printer, and prints an image on a print medium P by scanning a print head 105 in the X direction (scanning direction), which is perpendicular to the conveyance direction of the print medium P, or the Y direction.

A conveyance unit 111 which is driven by a conveyance motor 309 (see FIG. 3) via gears pulls the print medium P from a spool holding the print medium P in the form of a roll and feeds the print medium P in the Y direction. Note that sheet-fed paper (cut paper) can also be employed as the print medium in the present invention. The fed print medium P is nipped between and conveyed by a sheet feed roller and a pinch roller of the conveyance unit 111 to be guided to a printing position on a platen 104 serving as a support unit (a scanning region for the print head). Normally, in a standby state in which printing is not performed, the orifice face of the print head 105 in which ejection orifices are formed is capped. Thus, prior to printing, the cap is released so that the print head 105 and a carriage unit 102 can be scanned. Then, after data for a single scan is accumulated in a buffer, the carriage unit 102 is scanned by a carriage motor 310 (see FIG. 3) to print the data.

At a predetermined conveyance position on the print medium P, the carriage unit 102 is reciprocally moved by the carriage motor 310 along two guide shafts 103 extending in the X direction through a forward path in a +X direction and a return path in a −X direction. In the course of this movement, inks (liquids) are ejected from the ejection orifices in the print head 105 mounted on the carriage unit 102 in synchronization with a position signal obtained by an encoder 106 provided along the main scanning direction to perform printing on the print medium P. Thereafter, the printed print medium P is wound around a spool 101.

In the course of the reciprocal scanning, as with the print head 105, a detection signal corresponding to the position of the carriage unit 102 is processed in synchronization with the position signal obtained by the encoder 106 to convey the print medium P. A carriage belt can be used to transmit a driving force to the carriage unit 102 from the carriage motor. Alternatively, it is possible to use another driving method using, for example, a mechanism including a lead screw that is rotationally driven by the carriage motor and extends in the X direction and an engagement unit that is provided to the carriage unit 102 and engages the groove in the lead screw, instead of using a carriage belt.

The conveyance unit 111 includes a sheet feed roller and a pinch roller and conveys the print medium P while nipping it between the sheet feed roller and the pinch roller. The print medium P conveyed from the spool not illustrated holding the print medium P is printed by the print head 105 and then wound around the take-up spool 101, thereby forming a roll-shaped wound medium. The print head 105 mounted on the carriage unit 102 ejects the inks while being scanned by the carriage unit 102 in the X direction to apply the inks onto the print medium P. In this operation, the conveyance unit 111 intermittently conveys the print medium P in the +Y direction. As a result, an image is formed on the print medium P. The platen 104 prevents the print medium P from floating over the platen 104 by sucking the back surface of the print medium P at a position facing the scanning region for the print head 105 and the carriage unit 102.

Next, a configuration for drying and fixing the inks will be described. An air blow unit 112 includes a heater and a fan and blows air that is warmed (warm air) onto the front surface (printing region) of the print medium P on the platen 104. The temperature and speed of the warm air to be blown onto the front surface of the print medium P by the air blow unit 112 can be controlled at any values between predetermined upper and lower limits. The air blow unit 112 may be a unit that does not have a heat source and only blows air. Blowing air promotes evaporation of the moisture contained in the inks ejected onto the front surface of the print medium P on the platen 104, and therefore promotes fixation of the inks. A fixing unit 113 includes a heater and a fan and dries and fixes the inks applied onto the print medium P. The fixing unit 113 has a substantially box shape, and its bottom plane faces the surface of the print medium P to which the inks are applied (printing surface). Through this bottom plane, the fixing unit 113 blows warm air toward the printing surface of the print medium P to raise the temperatures of the inks and the print medium P, so that the water and the solvents contained in the inks evaporate and the liquid in the form of an emulsion turns into a film.

A downflow unit 114 blows the warm air discharged from the fixing unit 113 serving as a drying unit toward the surface of the printing apparatus 100 in contact with the ground by a fan. An air curtain unit 115 forms an air curtain at the entrance of the fixing unit 113 that prevents the ink mist forced to flow by the air blow unit 112 from entering the fixing unit 113. The air curtain unit 115 may be provided between the platen 104 and the fixing unit 113.

The printing apparatus 100 is capable of executing so-called multipass printing which prints an image on a unit region (1/n band) of the print medium P by multiple (n) printing scans of the print head 105. Details of this multipass printing and an ejection orifice configuration for performing the multipass printing will be described later. A configuration of the print head 105 will now be described in detail.

Figure 2:
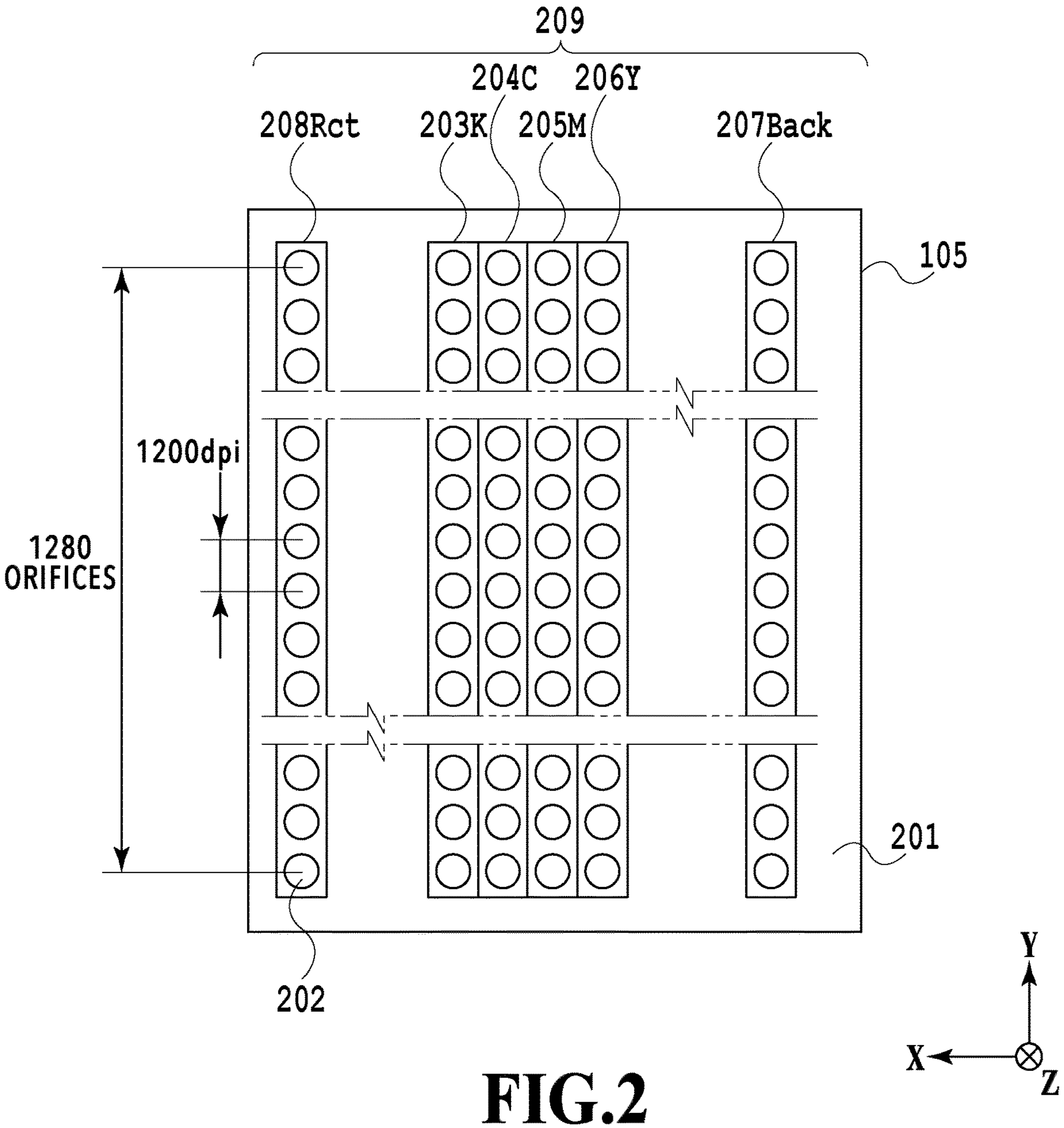
FIG. 2 is a view illustrating the orifice face of a print head in which ejection orifices are formed.

FIG. 2 is a view illustrating an orifice face 201 of the print head 105 in which ejection orifices 202 are formed. In the orifice face 201, multiple ejection orifice arrays 209 are formed each of which includes multiple ejection orifices 202 formed in an array. Each single ejection orifice array includes 1280 ejection orifices 202 arrayed in the Y direction at a density of 1200 orifices per inch.

The print head 105 includes an ejection orifice array 203K in which ejection orifices for ejecting a color material ink containing a black color material are arrayed, and an ejection orifice array 204C in which ejection orifices for ejecting a color material ink containing a cyan color material are arrayed. The print head 105 further includes an ejection orifice array 205M in which ejection orifices for ejecting a color material ink containing a magenta color material are arrayed, and an ejection orifice array 206Y in which ejection orifices for ejecting a color material ink containing a yellow color material are arrayed. The print head 105 further includes an ejection orifice array 207Back in which ejection orifices capable of ejecting a light-shielding ink, such as a white ink, are arrayed, and an ejection orifice array 208Rct in which ejection orifices for ejecting a reaction liquid are arrayed. The light-shielding ink forms a background on a transparent print medium or the like for performing suitable color printing.

In the present embodiment, the printing apparatus 100 is equipped with a reaction liquid that reacts with solid contents such as the color materials, fine resin particles, and the like contained in the inks to promote their aggregation. In particular, in a case of printing an image on a later-described poorly permeable print medium or non-permeable print medium, the printing apparatus 100 ejects the reaction liquid, so that the reaction liquid and the inks contact each other on the print medium, thereby insolubilizing part or all of the solid components of the color material inks. This promotes thickening through aggregation of the color materials. Consequently, a fine image without no or less beading is printed. The reaction liquid is preferably one that can react with solid contents contained not only in the chromatic color inks but also in the light-shielding ink to raise the viscosity. In the present embodiment, the same reaction liquid is used for the chromatic color inks and for the light-shielding ink to print images, but a different reaction liquid may be used for the chromatic color inks and for the light-shielding ink. In this case, another reaction liquid ejection orifice array needs to be added.

These ejection orifice arrays 209 are connected to ink tanks not illustrated storing the respective inks and are supplied with the inks therefrom. The print head 105 and the ink tanks used in the present embodiment may be configured integrally with each other or configured to be separable from each other.

Figure 3:
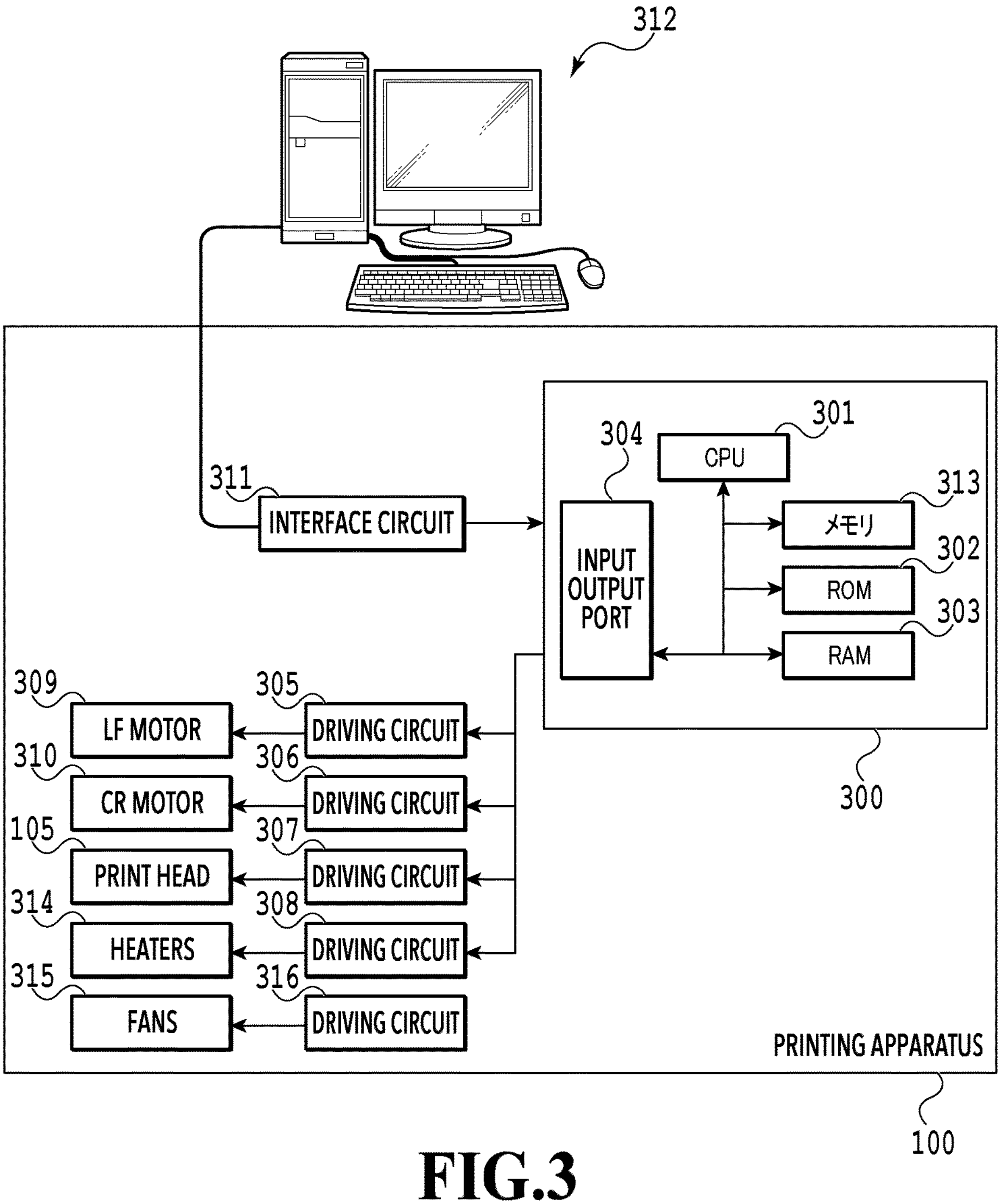
FIG. 3 is a block diagram illustrating a schematic configuration of a control system of the printing apparatus.

FIG. 3 is a block diagram illustrating a schematic configuration of a control system of the printing apparatus 100. A main control unit 300 includes a central processing unit (CPU) 301 that executes processing operations such as calculation, selection, determination, and control and printing operations, a read-only memory (ROM) 302 storing a control program to be executed by the CPU 301 and the like, a random-access memory (RAM) 303 to be used as a buffer for print data and the like, an input-output port 304, and the like. A memory 313 stores the mask patterns to be described later and the like. To the input-output port 304 are connected driving circuits 305, 306, 307, 308, and 316 of, for example, actuators of an LF motor 309, a CR motor 310, the print head 105, heaters 314, fans 315, and a cutting unit. The main control unit 300 is connected to a personal computer (PC) 312, which is a host computer, via an interface circuit 311. The heaters 314 includes the heaters of the air blow unit 112 and the fixing unit 113. The fans 315 include the fans of the air blow unit 112, the fixing unit 113, the downflow unit 114, and the air curtain unit 115.

Figure 4:
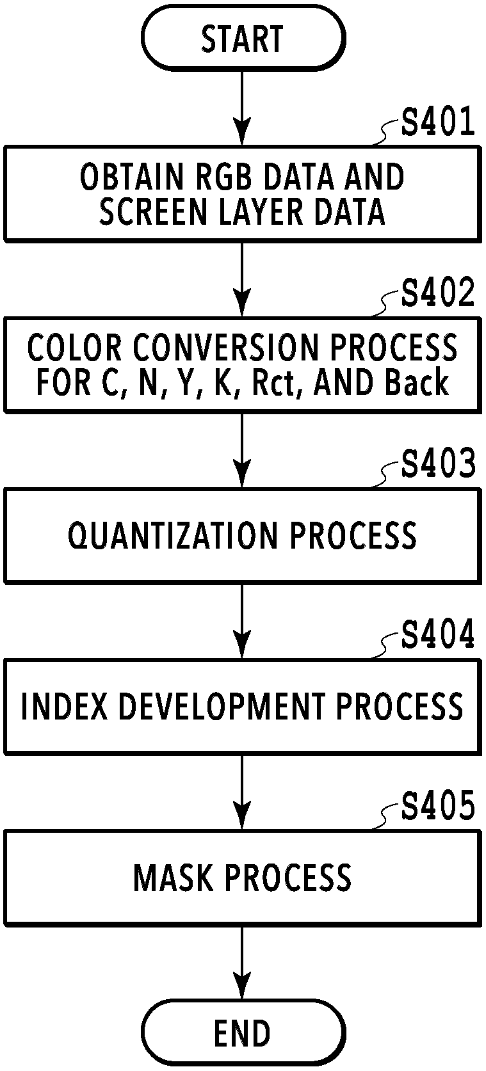
FIG. 4 is a flowchart illustrating a print data generation process by the printing apparatus.

FIG. 4 is a flowchart illustrating a print data generation process by the printing apparatus 100. The print data generation process by the printing apparatus 100 will be described below using the flowchart. Note that a CPU 301 in the printing apparatus 100 performs the series of processes illustrated in FIG. 4 by loading program code stored in the ROM 302 to the RAM 303 and executing it. Alternatively, the functions of some or all of the steps in FIG. 4 may be implemented with hardware such as an application-specific integrated circuit (ASIC) or an electronic circuit. Meanwhile, the symbol "S" in the description of each process means a step in the flowchart.

Once the print data generation process starts, in S401, image data (luminance data) is obtained which is input into the printing apparatus 100 from the PC 312 and represented by 8-bit (256-level) information (0 to 255) for each of red (R), green (G), and blue (B) colors. Similarly, a light-shielding layer too, light-shielding layer data represented by 8-bit (256-level) information is obtained in S401. The region on the print medium to be occupied by this light-shielding layer can be determined according to the color image to be laminated, determined as desired by the user of the apparatus, or determined according to print conditions.

Then, in S402, a color conversion process of converting the RGB data into CMYK data corresponding to the colors of the inks to be used in the printing is executed. This color conversion process generates CMYK data including 12-bit (4096-level) values for each of cyan (C), magenta (M), yellow (Y), and black (K). A similar color conversion process is executed for the light-shielding layer data as well. Reaction liquid data is generated according to the CMYK data and the light-shielding layer data obtained by these color conversion processes. For example, 20% of the tone value of each piece of data is set as corresponding reaction liquid data.

Then, in S403, the generated CMYK data is quantized to generate quantized data including 5-bit (32-level) values for each of C, M, Y, and K. A dithering method, an error diffusion method, or the like can be executed as this quantization process. The light-shielding layer data and the reaction liquid data are similarly quantized as well to generate 5-bit (32-level) data. In the present embodiment, the quantization process generates quantized data having a data resolution of 600 dpi.

Then, in S404, an index development process is performed to convert the CMYK data into 3-bit (8-level) values for each of C, M, Y, and K. An index development process is also performed on the light-shielding layer data and the reaction liquid data to convert them into 3-bit (8-level) data.

Lastly, in S405, color image data and the above pieces of data are subjected to a mask process corresponding to the later-described multipass printing and a mask process for distributing data to the multiple ejection orifice arrays to generate 1-bit data for each ejection orifice array in each printing scan. Then, the processing is terminated.

The inks are ejected from the print head 105 in accordance with print data generated as described above. While a configuration in which the CPU 301 in the printing apparatus 100 executes all of the processes of S401 to S405 has been described above, another configuration may be employed to execute the processes. For example, a configuration in which the PC 312 executes all of the processes of S401 to S405 may be employed. Alternatively, a configuration in which, for example, the PC 312 executes some of the processes and the printing apparatus 100 executes the rest may be employed.

Figure 5:
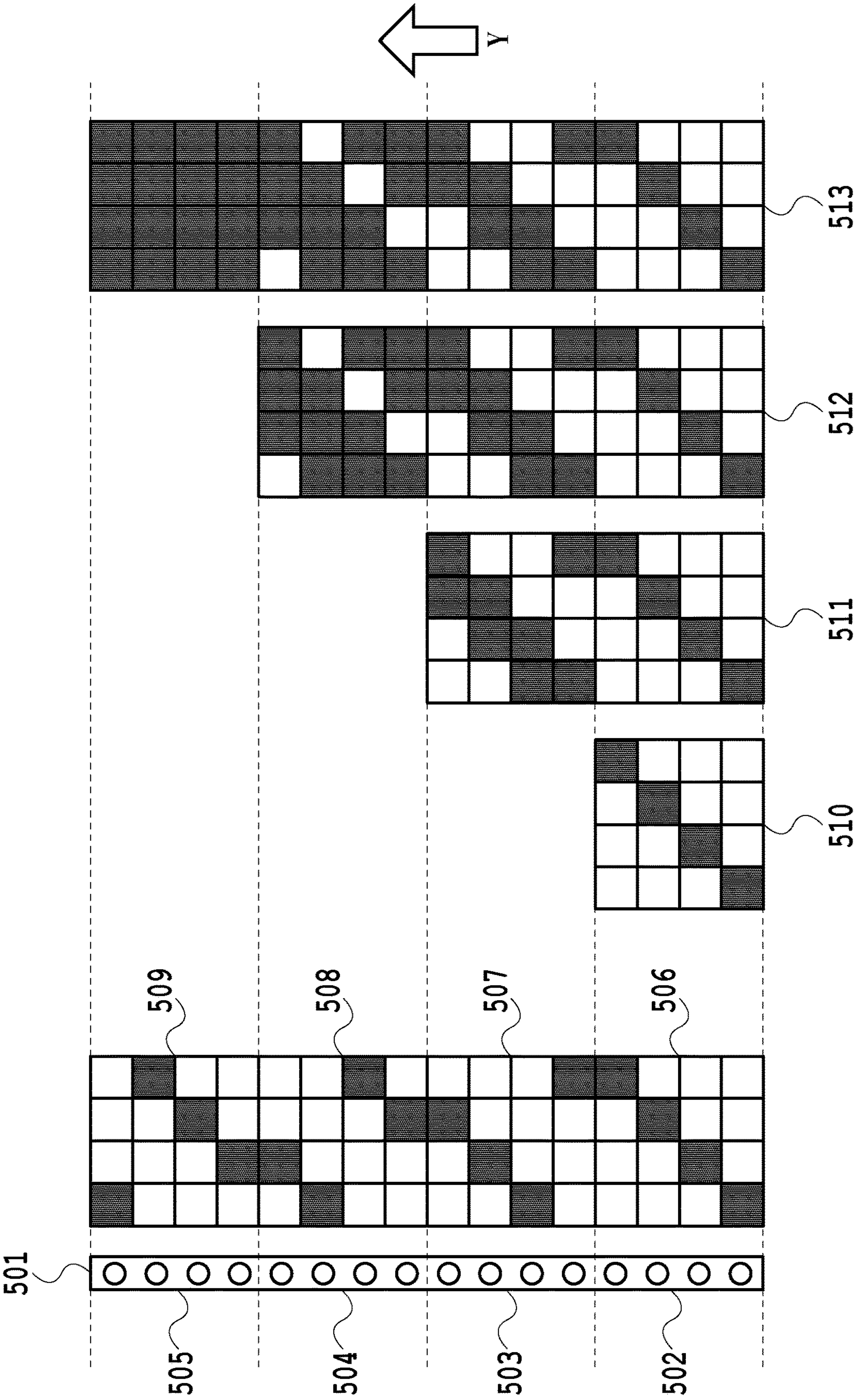
FIG. 5 is a diagram illustrating a printing method by multipass printing.

FIG. 5 is a diagram illustrating a printing method by multipass printing. In the present embodiment, images are printed by a multipass printing method in which multiple printing scans are performed on each unit region (predetermined region) of the print medium to perform printing. In FIG. 5, 4-pass multipass printing in which printing is performed in four scans will be described as an example. Also, for simpler description, an ejection orifice array 501 is illustrated as 16 ejection orifices for ejecting the same type of ink arranged in a single array.

In the case of performing 4-pass multipass printing, the 16 ejection orifices are divided into first to fourth ejection orifice regions 502 to 505 each including 4 ejection orifices. Further, the first to fourth ejection orifice regions 502 to 505 are associated with first to fourth mask patterns 506 to 509, respectively. Each mask pattern has a region with 4× 4 areas. Each area illustrated in black represents an area where printing a dot is permitted, whereas each area illustrated in white represents an area where printing a dot is not permitted. The first to fourth mask patterns have such a relationship that they complement each other.

Patterns 510 to 513 illustrated in association with the first to fourth printing scans illustrate how an image is completed on a print medium in a case of performing 4-pass multipass printing scans in accordance with the first to fourth mask patterns. Each time a printing scan is finished, the print medium conveyed by four pixels in the Y direction. The image in each unit region (4×4 pixel region) on the print medium is completed by four printing scans following the first to fourth mask patterns having the complementary relationship.

Figure 6A:
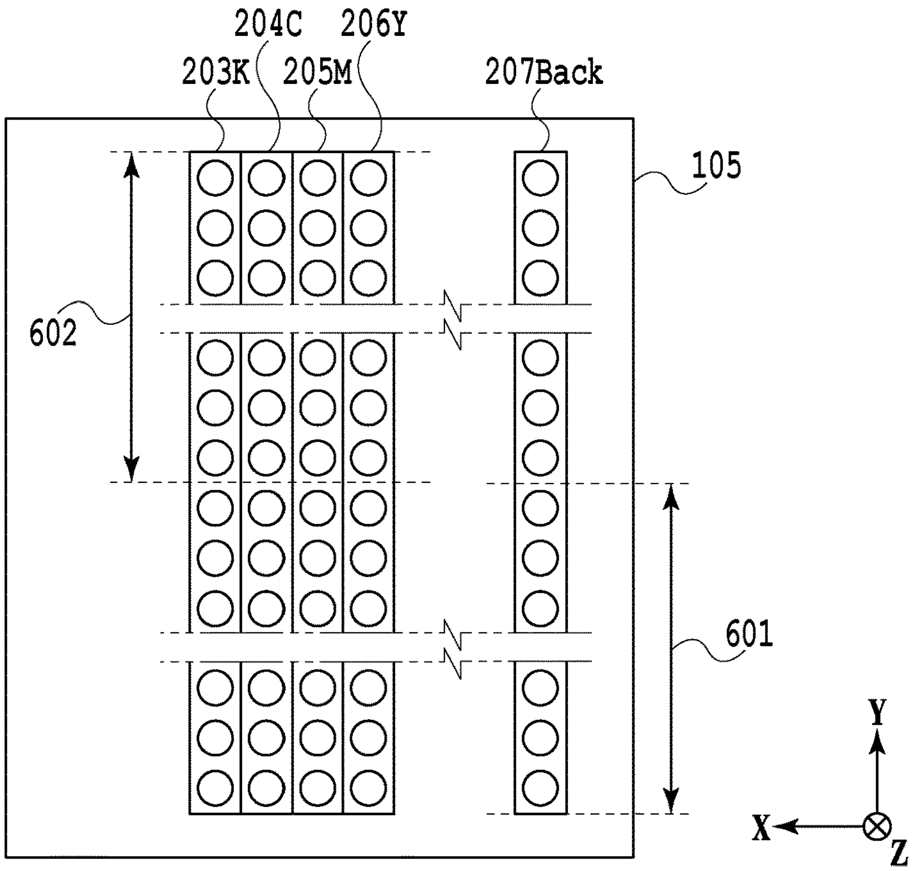
FIG. 6A is a view illustrating groups of ejection orifices to be used in printing.
Figure 6B:
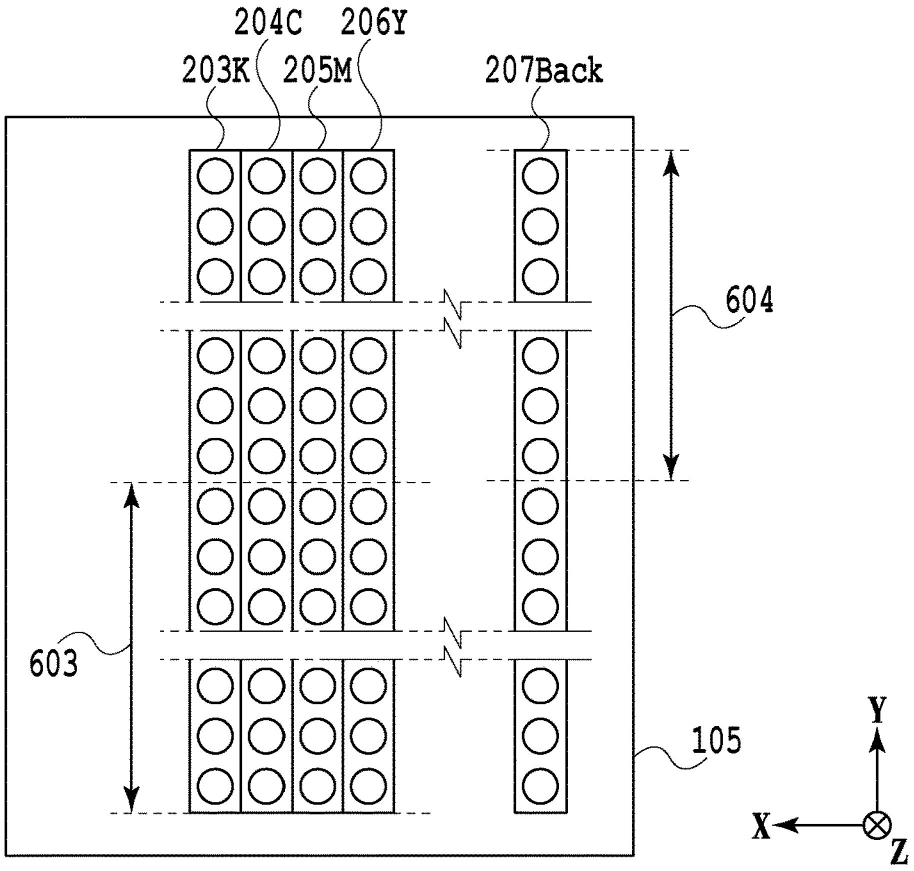
FIG. 6B is a view illustrating groups of ejection orifices to be used in printing.

FIGS. 6A and 6B are views illustrating groups of ejection orifices to be used in printing. The printing apparatus 100 is capable of printing an image including a light-shielding layer and a color image laminated one on top the other (light-shielding ink laminating print mode). Specific printing methods in the light-shielding ink laminating print mode will now be described below. The following will refer to FIG. 6A selectively illustrating the ejection orifice array 207Back for the light-shielding ink and the ejection orifice arrays 203K to 206Y for the chromatic color inks in the print head 105. Note that the print medium P is conveyed in the Y direction.

Assume a case of laminating a light-shielding layer and a color image on the print medium P in this order. The light-shielding layer is printed by using an ejection orifice group 601 located on the upstream side in the conveyance direction of print medium in the light-shielding ink ejection orifice array. On the other hand, the color image is printed by using an ejection orifice group 602 on the downstream side in the conveyance direction of the print medium in each chromatic color ink ejection orifice array. Here, the selectively used ejection orifice groups in the light-shielding ink ejection orifice array and the chromatic color ink ejection orifice arrays do not overlap each other in the printing scan direction. This enables the laminated image to be printed without the light-shielding layer and the color image getting mixed with each other. Specifically, in the case of employing the 4-pass multipass printing illustrated in FIG. 5, each unit region on the print medium undergoes formation of a light-shielding layer in four printing scans followed by formation of a color image on that light-shielding layer in subsequent four printing scans.

A case of laminating a color image and a light-shielding layer on the print medium P in this order will now be described with reference to FIG. 6B. The color image is printed by using an ejection orifice group 603 on the upstream side in the conveyance direction of the print medium in each chromatic color ink ejection orifice array. The light-shielding layer is printed by using an ejection orifice group 604 on the downstream side in the conveyance direction of print medium in the light-shielding ink ejection orifice array. Like the above-described case, this enables the laminated image to be printed without the light-shielding layer and the color image getting mixed with each other. Specifically, in the case of employing the 4-pass multipass printing illustrated in FIG. 5, each unit region on the print medium undergoes formation of a color image in four printing scans followed by formation of a light-shielding layer on the region of that color image in subsequent four printing scans.

Note that three or more layers of light-shielding layers and color images can be laminated. This is possible by selectively using the ejection orifices such that the ejection orifice group for printing the light-shielding layers and the ejection orifice group for printing the color images will not overlap each other in the X direction as in the above.

Next, the chromatic color inks and the light-shielding ink used in the present embodiment will be described. These inks contain solid components that form a light-shielding layer and color images and a liquid component that vaporizes. Examples of the liquid component include water and water-soluble organic solvents. Examples of the solid components include color materials such as pigments and dyes for the chromatic color inks and white pigments and metallic pigments for the light-shielding ink. A white pigment may be used for the purpose of improving the color development of the chromatic color inks. A metallic pigment may be used for the purpose of imparting a special gloss to the print medium. Each of the inks contains water-soluble fine resin particles intended to allow tight contact between the print medium and the color material to improve the scratch resistance (fixedness) of the printed image.

Also, in the present embodiment, a reaction liquid is used for the purpose of printing images on poorly permeable print media and non-permeable print media. The reaction liquid used in the present embodiment contains a reactive component that reacts with the pigments and the fine resin particles contained in the inks to cause them to aggregate or gel. Specifically, in a case where the reaction liquid is mixed on a print medium with an ink containing a pigment stably dispersed or dissolved in an aqueous medium by the function of an ionic group, this reactive component is a component that can destroy the stability of dispersion of the ink. Note that the reaction liquid does not necessarily have to be used in all printing mode, and is added in an amount necessary for image printing with the ink application amount taken into account.

The print medium in the present embodiment is not limited to paper or the like generally used in printing apparatuses, but also includes things that can receive inks such as cloth, plastic film, sheet metal, glass, ceramic, resin, wood, and leather. In particular, "non-permeable print medium" refers to a print medium with no ink permeability for aqueous inks. Also, "poorly permeable print medium" means a print medium with a lower ink permeability for aqueous inks than paper and the like generally used. In a more quantitative sense, "poorly permeable print medium" refers to a print medium with such a printing surface that the amount of water absorbed in 30 $msec^{1/2}$ after start of contact is 10 $mL/m^2$ or less in the Bristow method. This Bristow method is the most popular method to quickly measure the amount of liquid absorption, and even employed by the Japan Technical Association of the Pulp and Paper Industry (JAPAN TAPPI).

Details of the test method are described in Standard No. 51 "Paper and Paperboard-Liquid Absorption Test Method-Bristow Method" in "JAPAN TAPPI PAPER AND PULP TEST METHODS 2000 Version".

Examples of the non-permeable print medium include those that are not produced as print media for aqueous inkjet inks, such as glass, plastic, film, and Yupo. Examples also include those without a surface treatment for inkjet printing (those without an ink absorption layer formed thereon), such as plastic films and substrates such as paper coated with plastic. Examples of the plastic include polyvinyl chloride, polyethylene terephthalate, polycarbonate, polystyrene, polyurethane, polyethylene, polypropylene, and so on. Also, examples of the low-permeability print medium include print media such as printed book papers to be used in offset printing, etc., such as art paper and coated paper, and so on.

Figure 7A:
FIG. 7A is a diagram illustrating an excessive ink spreading phenomenon.
Figure 7B:
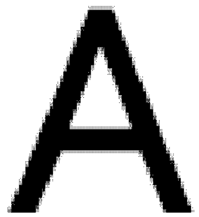
FIG. 7B is a diagram illustrating the excessive ink spreading phenomenon.

FIGS. 7A and 7B are diagrams illustrating an excessive ink spreading phenomenon. Assume a case of printing an image on a non-permeable print medium or poorly permeable print medium with high wettability by using an ink in the present embodiment. In this case, the ink or the reaction liquid having landed on the surface of the print medium spreads around beyond an appropriate range due to the high wettability. It has been found that this may cause an image deterioration such widening of characters or ruled lines and disruption of contours (see FIG. 7A).

It has been found that blowing air onto a print medium with high wettability on the platen during printing by the air blow unit 112 described earlier is an effective way to prevent the excessive ink spreading phenomenon on such a print medium P. Continuously blowing air onto the print medium P on the platen during printing promotes drying of the ink and the reaction liquid having landed on the surface of the print medium and thus promotes a raise in viscosity. This prevents the excessive spread and therefore prevents the image deterioration (see FIG. 7B).

On the other hand, in a case of a print medium with lower permeability and low wettability, the ink will shrink instead of spreading to the appropriate range and dry if the air blow unit 112 is actuated. This phenomenon will be hereinafter referred to as "excessive ink shrinkage phenomenon. In the case where the excessive ink shrinkage phenomenon occurs, streaky unevenness will be visible in the fixed image. Thus, a preferred image quality cannot be achieved. To address this, in the case of a print medium with low permeability and low wettability, the air blow unit 112 is not actuated to promote spreading of the ink to an appropriate extent. In this way, the preferred image quality will be achieved.

Figure 8A:
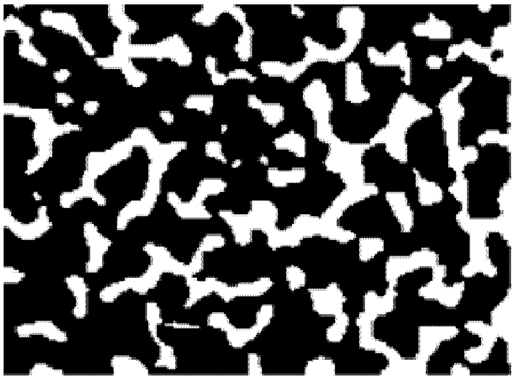
FIG. 8A is a diagram illustrating an excessive ink shrinkage phenomenon.
Figure 8B:
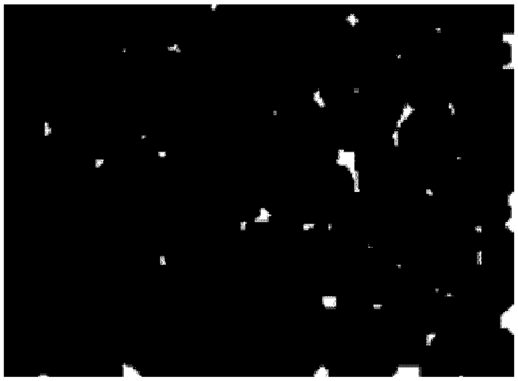
FIG. 8B is a diagram illustrating the excessive ink shrinkage phenomenon.

FIGS. 8A and 8B are diagrams illustrating the excessive ink shrinkage phenomenon. Assume a case of printing an image on a non-permeable print medium or poorly permeable print medium with low wettability. In this case, blowing air during the printing will excessively promote drying of the ink droplets having landed on the surface of the print medium. As a result, the ink droplets will shrink instead of spreading to appropriate ranges on the print medium, so that the ink will not sufficiently cover the surface of the print medium. This will cause image deteriorations such as decreased color development and formation of streaky unevenness (see FIG. 8A). This phenomenon can be prevented by weakening the air blow during the printing by the air blow unit 112 and thereby lowering the strength of the drying (see FIG. 8B).

To do so, in the case of performing printing on a print medium with a wettability higher than a reference level, which is susceptible to the excessive ink spreading phenomenon, the printing apparatus 100 in the present embodiment blows air with the air blow unit 112 during the printing operation to promote drying of the ink and the reaction liquid on the print medium. In the case of performing printing on a print medium with a wettability lower than the reference level, which is susceptible to the excessive ink shrinkage phenomenon, the printing apparatus 100 does not blow air with the air blow unit 112 during the printing operation.

In this way, it is possible to prevent quality deteriorations such as decreased color development and formation of streaky unevenness due to excessive shrinkage of ink droplets in image printing on a print medium with low wettability, and thus provide a print-out with a preferred image quality.

A wettability evaluation method will now be described. In order to perform control corresponding to the wettability of the print medium P, the printing apparatus 100 in the present embodiment holds information on the wettability of the print medium P in the ROM 302 of the printing apparatus 100. The wettability of the print medium P can be evaluated by a method as below, for example.

The contact angle of an ink droplet in contact with the print medium is measured. This can evaluate the wettability of the print medium. Such measurement can be carried out using any of various commercially available contact angle gauges.

FIG. 9 is a diagram illustrating a list of wettability evaluation results by the above method on several types of commercially available print media supported by the printing apparatus 100 in the present embodiment. For the measurement, print medium pieces and the black ink were prepared, and the contact angle of a black ink droplet from the printing apparatus with the surface of each print medium piece was measured 0.1 second after coming into contact with the surface by using a contact angle gauge DMo-701 (manufactured by Kyowa Interface Science Co., Ltd.). Each print medium can be evaluated such that the smaller the value of the contact angle, the higher the wettability and the less susceptible the print medium is to the excessive ink spreading phenomenon, and the larger the value of the contact angle, the lower the wettability and the less susceptible the print medium is to the excessive ink shrinkage phenomenon.

Pieces of information based on the values of the ink contact angles thus measured are held in association with the respective print medium types as print medium profiles in the ROM 302 of the printing apparatus 100. In this way, it is possible to select an optimal air blow condition during printing based on the wettability of the print medium to be used.

Incidentally, simpler measurement can be performed by the following method to evaluate the wettability of a print medium. First, an ink droplet of a predetermined amount is dripped onto the print medium with a pipette. Then, the diameter of the ink droplet on the print medium is measured after a predetermined time. The wettability can be simply evaluated by such a method.

FIG. 10 is a diagram illustrating a list of ink wetting diameter ratios in wettability evaluation results of the several types of commercially available print media supported by the printing apparatus 100 in the present embodiment. Here, an ink wetting diameter ratio d1/d0 is a value obtained by dividing a diameter d1 of an ink droplet measured 30 seconds after landing by a diameter do (approximately 5.76 mm) of a sphere having a volume of 100 μl. In this measurement, print medium pieces and the black ink were prepared, and a 100-μl droplet of the black ink was dropped onto the surface of each print medium piece with a powered pipette, and the diameter d1 of the ink droplet 30 seconds after the drop was measured by imaging it with a low-magnification microscope.

Each print medium can be evaluated such that the larger the ink wetting diameter ratio d1/d0, the higher the wettability of the print medium and the smaller the ink wetting diameter ratio d1/d0, the lower the wettability of the print medium.

Such a measurement method can evaluate the magnitude of the wettability of a print medium even in an environment where a contact angle gauge cannot be prepared. Pieces of information in which the evaluation results thus obtained and the respective print media are associated with each other may be held as print medium profiles in the ROM 302 of the printing apparatus. In this way, in a case of determining the conditions for a printing operation, it is possible to select an optimal air blow condition during printing based on the wettability of the print medium.

Figure 11:
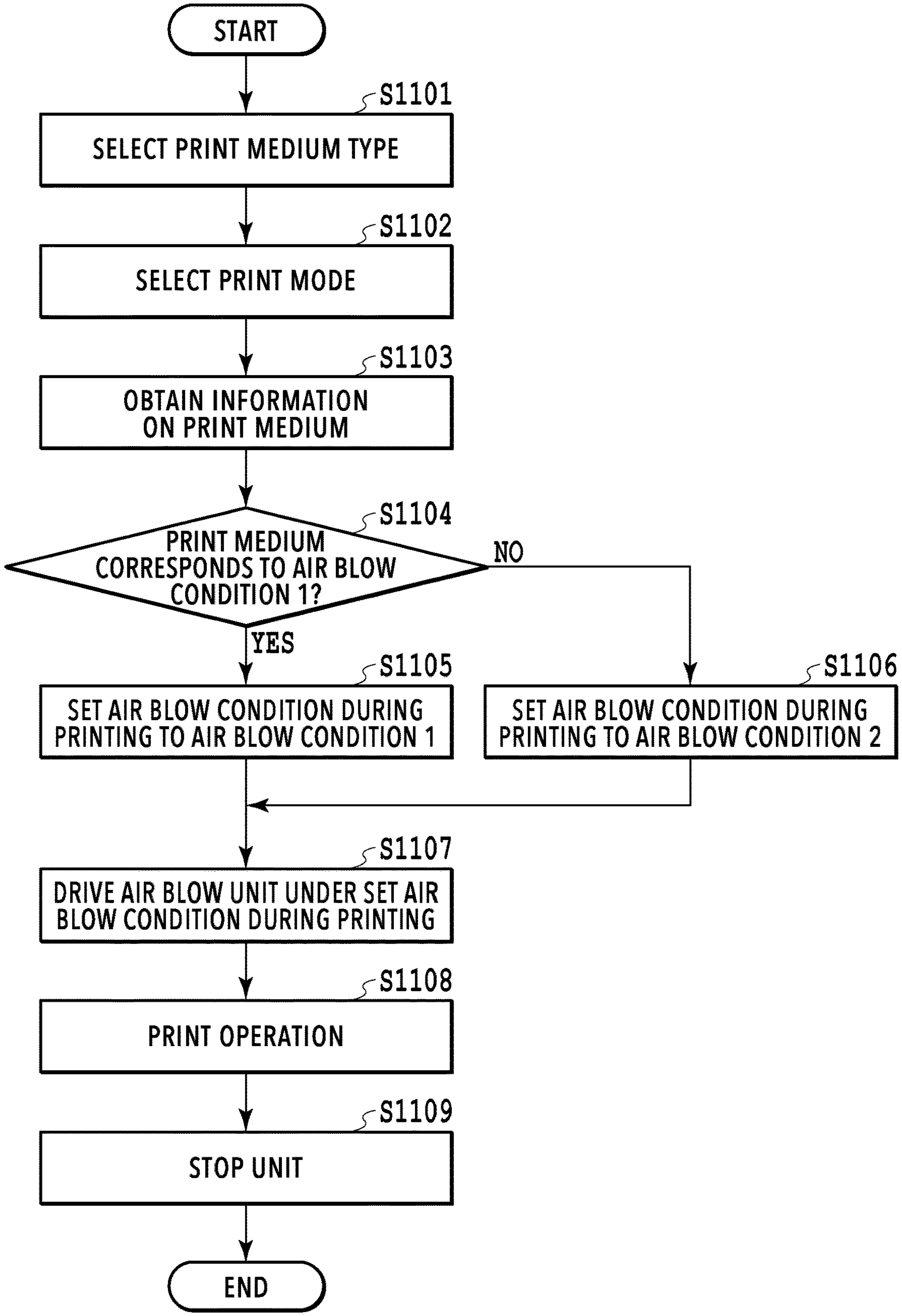
FIG. 11 is a flowchart illustrating print processing by the printing apparatus.

FIG. 11 is a flowchart illustrating print processing by the printing apparatus 100 in the present embodiment. The print processing by the printing apparatus 100 in the present embodiment will be described below using the flowchart of FIG. 11. Note that the CPU 301 of the printing apparatus 100 performs the series of processes illustrated in FIG. 11 by loading program code stored in the ROM 302 to the RAM 303 and executing it. Alternatively, the functions of some or all of the steps in FIG. 11 may be implemented with hardware such as an ASIC or an electronic circuit. Meanwhile, the symbol "S" in the description of each process means a step in the flowchart.

Figure 12:
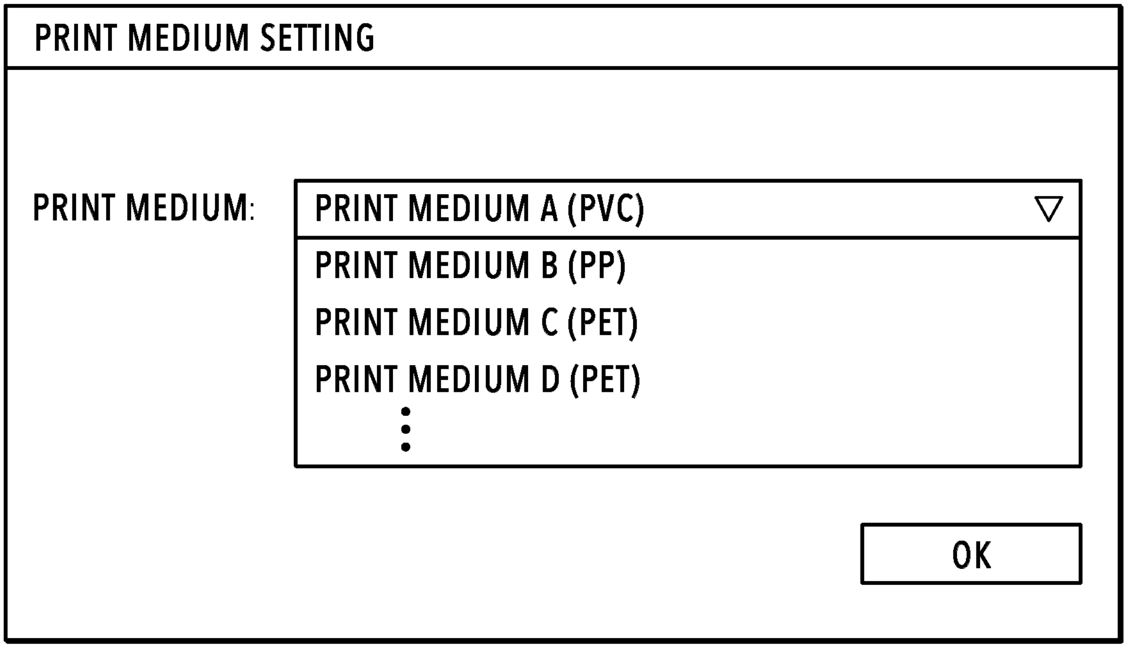
FIG. 12 is a diagram illustrating an example of a print medium type selection user interface.

Once the print processing starts, in S1101, a print medium type selection user interface is displayed to the user, and the user in turn selects the print medium type to be used in the printing. FIG. 12 is a diagram illustrating an example of the print medium type selection user interface. In the print medium type selection user interface, a light-shielding with a list of print medium types supported by the printing apparatus 100 is displayed, and the user selects one of them. Alternatively, the printing apparatus 100 may be equipped with a function of automatically detecting the type of a print medium set on the printing apparatus 100, and configured to automatically determine the print medium type instead of having the user select it.

Figure 13:
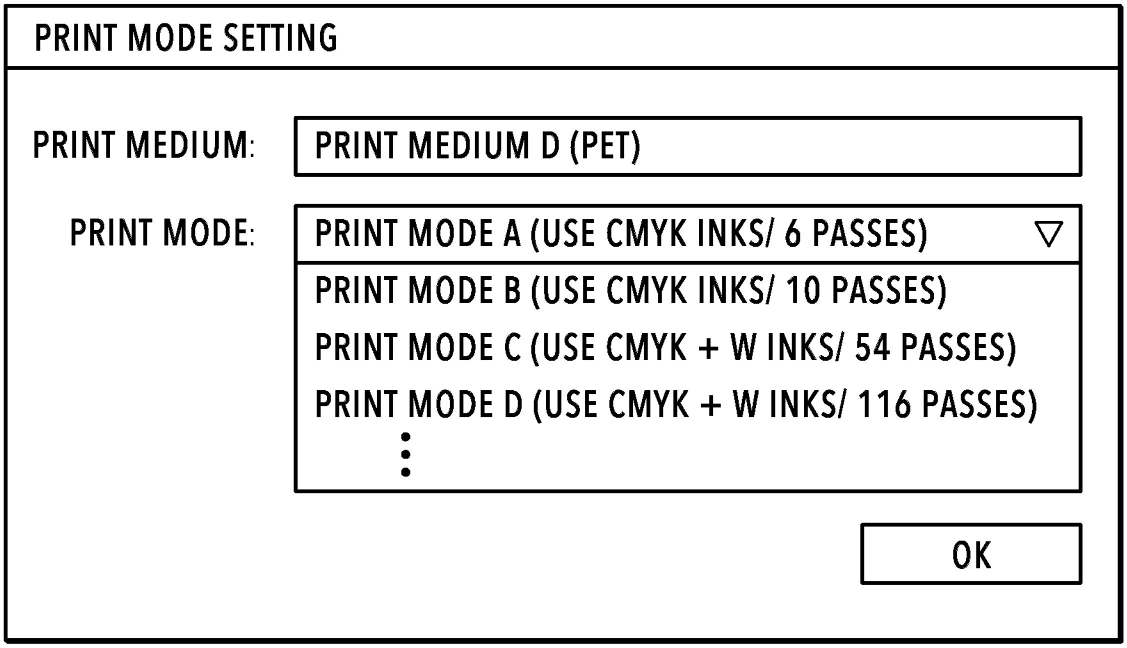
FIG. 13 is a diagram illustrating an example of a print mode selection user interface.

Thereafter, in S1102, a print mode selection user interface is displayed to the user, and the user in turn selects a desired print mode. The selectable print modes differ depending on the print medium type selected in S1101. FIG. 13 is a diagram illustrating an example of the print mode selection user interface. The user can select a print mode from among multiple modes differing in the inks and the number of passes to be used. This example illustrates a display instance in which "Print Medium D (PET)" has been selected in S1101. A light-shielding with a list of print modes usable for "Print Medium D (PET)" is displayed, and the user selects one of them.

Thereafter, in S1103, information on the print medium to be subjected to printing selected in S1102 is obtained from the ROM 302 of the printing apparatus 100. The information obtained in this step is information based on the ink contact angle on the print medium. In a case of a print medium with a small contact angle, i.e., a print medium with high wettability, the print medium is classified as one corresponding to an air blow condition 1 (with air blow). On the other hand, in a case of a print medium with a large contact angle, i.e., a print medium with low wettability, the print medium is classified as one corresponding to an air blow condition 2 (without air blow). Then, in S1104, it is determined whether the information on the print medium obtained in S1103 corresponds to the air blow condition 1. If the information corresponds to the air blow condition 1 (Yes), the processing proceeds to S1105, in which the air blow condition is set to the air blow condition 1. If the information does not correspond to the air blow condition 1 (No), the processing proceeds to S1106, in which the air blow condition is set to the air blow condition 2.

FIG. 14 is a diagram illustrating air blow conditions during printing for the printing apparatus 100. Under the air blow condition 1, air is blown at an air temperature of 30° C. as the temperature setting and an air speed of 3 m/s as the speed setting. Under the air blow condition 2, air is not blow. Note that the air temperature setting and the air speed setting of the air blow condition 1 are not limited to the above.

Thereafter, in S1107, the air blow unit 112 is driven under the determined air blow condition. Specifically, in the case where the set air blow condition is the air blow condition 1, the air blow unit 112 is driven such the air blow temperature will be 30° C. and the air blow speed will be 3 m/s. In the case where the set air blow condition is the air blow condition 2, the air blow unit 112 is not driven. Then, in S1108, the print head 105, the carriage unit 102, the conveyance unit 111 are driven as appropriate according to the print mode setting selected in S1102 to perform printing on the print medium P. Moreover, the fixing unit 113 is caused to operate as appropriate to make the liquid in the form of an emulsion into a film. Thereafter, in S1109, the air blow unit 112 is stopped, and the processing is terminated.

In the present embodiment, an example in which the air blow condition is selected between the air blow condition 1 for blowing air and the air blow condition 2 for not blowing air has been described. However, the present embodiment is not limited to this example. Two or more air blow conditions may be set based on the degree of the contact angle, and the air blow by the air blow unit 112 may be controlled in a stepwise manner. Specifically, for example, the air blow conditions 1, 2, and 3 may be set in ascending order of the value of the ink contact angle, and the air speeds of the air blow unit 112 under these conditions may be set in descending order as air speeds 1, 2, and 3, respectively. In this way, the air blow may be controlled such that the smaller the value of the ink contact angle is, the faster the air blow speed becomes.

As described above, the air blow condition during printing for the air blow unit 112 is varied to match the print medium P to be subjected to printing according to the correspondence between the print medium P and the air blow condition based on the wettability of the print medium P. In this way, it is possible to output high-quality images regardless of the levels of permeability and wettability of the print medium.

Second Embodiment

A second embodiment of the present invention will be described below with reference to drawings. Note that the basic configuration in the present embodiment is similar to that in the first embodiment, and the characteristic configuration will therefore be described below. In the present embodiment, a printing operation is performed with the air blow condition during the printing determined with not only the wettability of the print medium but also other characteristics of the print medium and print conditions taken into account.

The printing apparatus 100 can select a light-shielding ink laminating print mode in a case where the print medium P is a transparent print medium. In the light-shielding ink laminating print mode, a large amount of the light-shielding ink is used in addition to the chromatic color inks to form an image on the print medium. Accordingly, it will take a long time to dry the inks as compared to the print modes that use only the chromatic color inks. The ink drying time limits the printing speed. The printing speed can be improved by enhancing the ink drying performance via blowing air during printing with the air blow unit 112.

Thus, in a case where the print medium P is a transparent print medium and a light-shielding ink laminating print mode is selected, air may be blown with the air blow unit 112 regardless of the wettability of the print medium. This will promote drying of the light-shielding ink and thus improve the printing speed and the productivity in the light-shielding ink laminating print mode.

Incidentally, there are ink-permeable print media that are susceptible to a phenomenon called cockling, in which the sheet expands and contracts as it absorbs ink and gets deformed into a wavy shape. The occurrence of this cockling increases the likelihood of contact between the print medium and the print head and image deterioration such as density unevenness. However, the cockling phenomenon can be prevented by blowing air with the air blow unit 112 to promote drying of the absorbed ink.

Then, print medium types that get greatly deformed by cockling may be stored in advance and, in a case where any of the print medium types that get greatly deformed by cockling is selected in the print medium type setting, air may be blown with the air blow unit 112 regardless of other characteristics of the print medium such as its wettability. In this way, a print medium having a high risk of experiencing cockling will receive air blown onto it, thereby promoting drying of the absorbed ink. This reduces the risk of experiencing cockling.

Air may be blown in a stepwise manner according to the ease of cockling deformation such that a print medium that is more susceptible to cockling deformation will be subjected to air blow with a higher drying effect. For example, faster or hotter air may be blown onto a print medium that is more susceptible to cockling deformation.

FIG. 15 is a diagram illustrating profile data of print media. The print medium profile data contains information indicating the ease of cockling of each print medium and information on the wettability of each print medium. By storing profile data as illustrated in FIG. 15 in the ROM 302, the printing apparatus 100 can refer to the print medium profile data as necessary.

Figure 16:
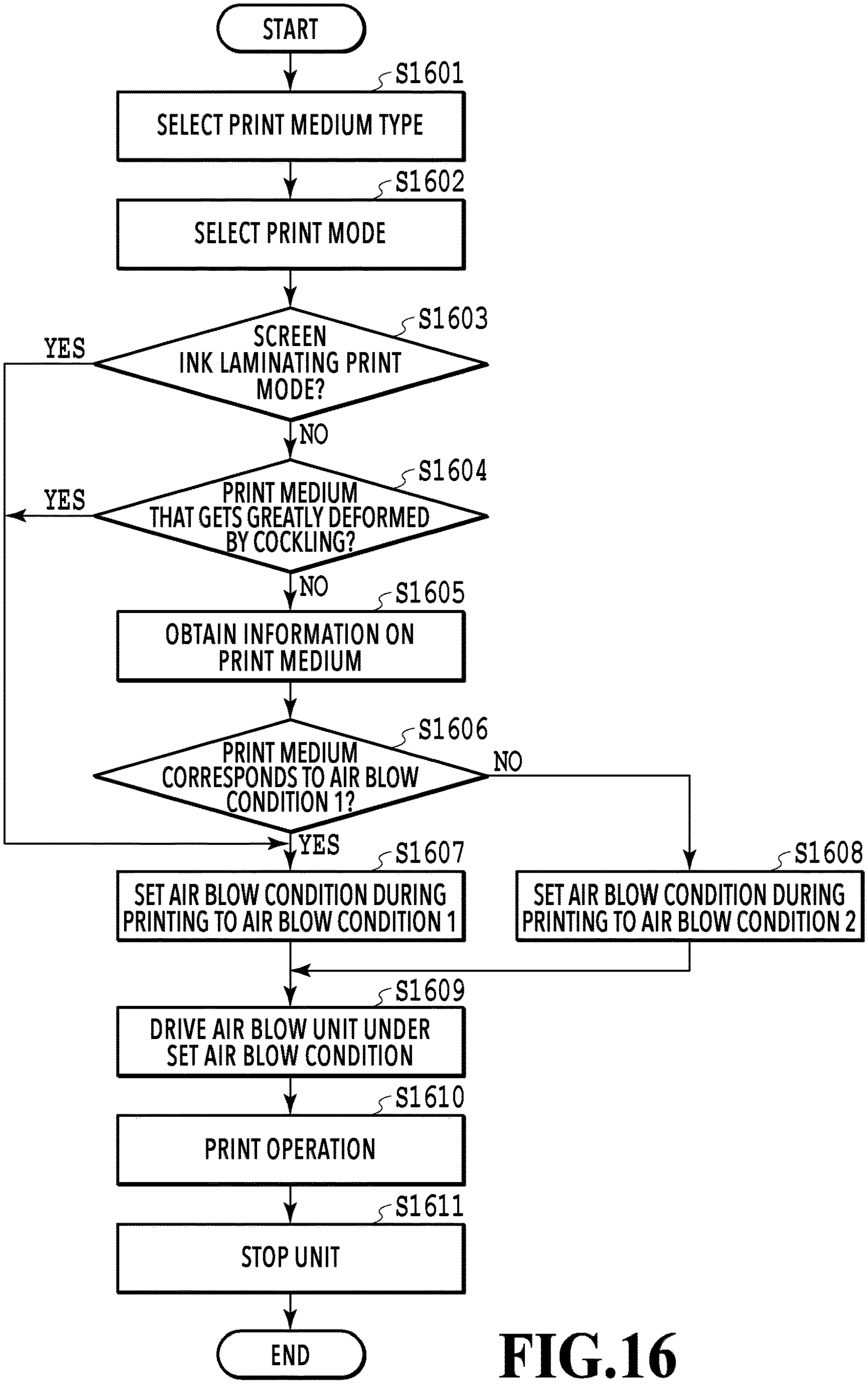
FIG. 16 is a flowchart illustrating print processing.

FIG. 16 is a flowchart illustrating print processing by the printing apparatus 100 in the present embodiment. The print processing by the printing apparatus 100 in the present embodiment will be described below using the flowchart of FIG. 16. Note that the CPU 301 of the printing apparatus 100 performs the series of processes illustrated in FIG. 11 by loading program code stored in the ROM 302 to the RAM 303 and executing it. Alternatively, the functions of some or all of the steps in FIG. 16 may be implemented with hardware such as an ASIC or an electronic circuit. Meanwhile, the symbol "S" in the description of each process means a step in the flowchart.

Once the print processing starts, in S1601, the print medium type selection user interface (see FIG. 12) is displayed to the user, and the user in turn selects the print medium type to be used in the printing. A light-shielding ink laminating print mode can be selected in S1602 in a case where the print medium selected in S1601 is a transparent print medium or the like. Thereafter, in S1602, the print mode selection user interface (see FIG. 13) is displayed to the user, and the user in turn selects a desired print mode. The selectable print modes differ depending on the print medium type selected in S1601. In the example of FIG. 13, "Print Mode C" and "Print Mode D" are light-shielding ink laminating print modes.

Thereafter, in S1603, it is determined whether the print mode selected in S1602 is a light-shielding ink laminating print mode. If the print mode is a light-shielding ink laminating print mode, the processing proceeds to S1607, in which the air blow condition during printing is set to the air blow condition 1. On the other hand, if the print mode is not a light-shielding ink laminating print mode (the print mode is a print mode that uses only the chromatic color inks), the processing proceeds to S1604.

In S1604, it is determined whether the print medium type selected in S1601 is a print medium that gets greatly deformed by cockling by referring to the print medium profile data in the ROM 302. If the print medium type is a print medium that gets greatly deformed by cockling, the processing proceeds to S1607, in which the air blow condition during printing is set to the air blow condition 1. On the other hand, if the print medium type is not a print medium that gets greatly deformed by cockling, the processing proceeds to S1605.

In S1605, the print medium profile information in the ROM 302 is searched for the print medium type selected in S1601, and the information on the selected print medium type (the information based on the ink contact angle) is obtained. Then, in S1606, it is determined whether the information on the print medium obtained in S1605 corresponds to the air blow condition 1. The processes of S1606 and the subsequent steps are similar to the processes of S1104 and the subsequent steps in FIG. 11, and description thereof is therefore omitted.

As described above, the air blow condition for the air blow unit 112 during printing is varied with a light-shielding ink laminating print mode, which is a print mode, and the effect of cockling on the print medium P taken into account in addition to the wettability of the print medium. In this way, it is possible to output high-quality images regardless of the degrees of permeability and wettability of the print medium as well as whether the light-shielding ink is used and the degree of cockling.

OTHER EMBODIMENTS

The above embodiments have been described based on an example in which images are printed by multipass printing, but the embodiments are not limited to this example. Even in the case of single-pass printing, it is possible to reduce the deterioration in printing quality due to the ink breeding and the deterioration in printing quality due to the streaky unevenness.

Moreover, the embodiments have been described based on an example with a serial printer, but are not limited to this example. The embodiments may be applied to line printers that use a line head in which ejection orifices are arrayed in a region extending over the width of a print medium.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-038995 filed Mar. 13, 2023, which is hereby incorporated by reference wherein in its entirety.

What is claimed is:

1. A printing apparatus comprising:

a printing unit configured to perform printing by ejecting a liquid onto a print medium;

a support unit configured to support the print medium to be printed by the printing unit;

a blow unit configured to blow air onto the print medium supported by the support unit; and a control unit configured to cause the blow unit to blow air under a first condition in a case where the print medium is a first print medium, and cause the blow unit to blow air under a second condition which exerts a higher drying effect than the first condition in a case where the print medium is a second print medium on which a contact angle of the liquid is smaller than a contact angle of the liquid on the first print medium.

2. The printing apparatus according to claim 1, wherein the first condition is a condition for stopping the blow unit, and the second condition is a condition for causing the blow unit to blow air.

3. The printing apparatus according to claim 2, wherein the control unit causes the blow unit to blow air so as to exert a higher drying effect the more susceptible the print medium is to cockling.

4. The printing apparatus according to claim 3, wherein the blow unit is capable of changing an speed at which to blow air, and the control unit causes the blow unit to blow air at a higher speed the more susceptible the print medium is to cockling.

5. The printing apparatus according to claim 3, wherein the blow unit is capable of changing a temperature of air to be blown, and the control unit causes the blow unit to blow air at a higher temperature the more susceptible the print medium is to cockling.

6. The printing apparatus according to claim 1, wherein the blow unit is capable of changing an air speed at which to blow air, and an air speed under the second condition is higher than an air speed under the first condition.

7. The printing apparatus according to claim 1, wherein the blow unit is capable of changing a temperature of air to be blown, and a temperature under the second condition is higher than a temperature under the first condition.

8. The printing apparatus according to claim 1, wherein the printing unit is capable of ejecting a light-shielding ink for forming a background on which to perform printing, and the control unit causes the blow unit to blow air in a case where the printing unit ejects the light-shielding ink in printing.

9. The printing apparatus according to claim 8, wherein the light-shielding ink is a white ink.

10. The printing apparatus according to claim 1, further comprising a drying unit configured to dry the applied liquid on the print medium after being printed by the printing unit.

11. The printing apparatus according to claim 1, further comprising a storage unit configured to store correspondence between a print medium type and an air blow condition for the blow unit.

12. The printing apparatus according to claim 1, wherein the printing unit ejects a color material ink and a reaction liquid that insolubilizes part or entirety of a solid component in the color material ink.

13. The printing apparatus according to claim 1, wherein the control unit is capable of executing multipass printing in which the printing unit is scanned a plurality of times over a predetermined region of the print medium to complete printing on the predetermined region, and the control unit causes the blow unit to blow air so as to exert a higher drying effect the smaller the number of times the printing unit is scanned.

14. The printing apparatus according to claim 1, further comprising a roller configured to convey the print medium in a conveyance direction, wherein the blow unit blows air onto the print medium from a position upstream of the printing unit in the conveyance direction.

15. The printing apparatus according to claim 1, further comprising a drying unit configured to dry the print medium printed by the printing unit.

16. The printing apparatus according to claim 15, wherein the drying unit includes a heater to heat air to be blown onto the print medium.

17. The printing apparatus according to claim 1, further comprising a roller configured to convey the print medium in a conveyance direction; and a carriage configured to carry the printing unit and move in a direction crossing the conveyance direction.

18. A method of controlling a printing apparatus including:

a printing unit configured to perform printing by ejecting a liquid onto a print medium;

a support unit configured to support the print medium to be printed by the printing unit; and a blow unit configured to blow air onto the print medium supported by the support unit, the method comprising:

causing the blow unit to blow air under a first condition in a case of performing printing on a first print medium; and causing the blow unit to blow air under a second condition which exerts a higher drying effect than the first condition in a case of performing printing on a second print medium on which a contact angle of the liquid is smaller than a contact angle of the liquid on the first print medium.

19. A non-transitory computer readable storage medium storing a program which causes a computer of a printing apparatus including:

a printing unit configured to perform printing by ejecting a liquid onto a print medium;

a support unit configured to support the print medium to be printed by the printing unit; and a blow unit configured to blow air onto the print medium supported by the support unit, to execute a control method comprising:

causing the blow unit to blow air under a first condition in a case of performing printing on a first print medium; and causing the blow unit to blow air under a second condition which exerts a higher drying effect than the first condition in a case of performing printing on a second print medium on which a contact angle of the liquid is smaller than a contact angle of the liquid on the first print medium.

* * * * *